(12) United States Patent
Park et al.

(10) Patent No.: US 8,519,285 B2
(45) Date of Patent: Aug. 27, 2013

(54) ONE BODY-TYPE POWER TRANSFER SWITCH

(75) Inventors: No-Chun Park, Seoul (KR); Choong-Hyun Lee, Seoul (KR)

(73) Assignee: Vitzrotech Co., Ltd, Gyeonggi-do (KR)

( * ) Notice: Subject to any disclaimer, the term of this patent is extended or adjusted under 35 U.S.C. 154(b) by 267 days.

(21) Appl. No.: 12/777,598

(22) Filed: May 11, 2010

(65) Prior Publication Data

US 2010/0307895 A1 Dec. 9, 2010

(30) Foreign Application Priority Data

Jun. 5, 2009 (KR) .................. 10-2009-0049845

(51) Int. Cl.
*H01H 1/64* (2006.01)
(52) U.S. Cl.
USPC ........................................................ 200/290
(58) Field of Classification Search
USPC ............ 200/293; 335/202; 307/64; 337/20
See application file for complete search history.

(56) References Cited

U.S. PATENT DOCUMENTS

| 4,590,387 A * | 5/1986 | Yoshida et al. ............. 307/64 |
| 6,784,385 B2 * | 8/2004 | Hernandez-Perez ...... 200/50.33 |
| 6,815,622 B2 * | 11/2004 | Milman et al. ............. 200/5 R |
| 7,498,923 B2 * | 3/2009 | Iversen ...................... 337/165 |

FOREIGN PATENT DOCUMENTS

| KR | 20-1987-0002087 U | 4/1987 |
| KR | 10-0189126 B1 | 1/1999 |

* cited by examiner

*Primary Examiner* — Vanessa Girardi
(74) *Attorney, Agent, or Firm* — Ohlandt, Greeley, Ruggiero & Perle, LLP

(57) ABSTRACT

Provided is a one body-type power transfer switch, in which a disconnecting portion is integrally formed to reduce errors arisen due to accumulated assembly tolerance and simplify manufacturing processes, thereby improving operators' convenience. The one body-type power transfer switch includes a normal power terminal or an emergency power terminal, a module including a load terminal formed at a lower portion of a side of the module so as to be spaced apart from the normal power terminal or the emergency power terminal, wherein the module is formed using an injection molding method, and side walls are integrally formed to have insulating power.

1 Claim, 3 Drawing Sheets

PRIOR ART

ONE BODY-TYPE POWER TRANSFER SWITCH

CROSS-REFERENCE TO RELATED PATENT APPLICATION

This application claims the benefit of Korean Patent Application No. 10-2009-0049845, filed on Jun. 5, 2009, in the Korean Intellectual Property Office, the disclosure of which is incorporated herein in its entirety by reference.

BACKGROUND OF THE INVENTION

1. Field of the Invention

The present invention relates to a power transfer switch, and more particularly, to a one body-type power transfer switch in which a disconnecting portion is integrally formed to reduce errors arisen due to accumulated assembly tolerance and simplify manufacturing processes, thereby improving operators' convenience.

2. Description of the Related Art

Generally, when power is shut off from a substation to a workplace or building including a self generator, a power transfer switch automatically transfers power from an interior wiring terminal to a self generator to continue to supply power. Then, when power is normally supplied from the substation, the power transfer switch automatically transfers power so that power may be normally supplied from the substation.

The power transfer switch alternatively connects two different power sources, such as a normal power source and an emergency power source, or a star-connection power source and delta-connection power source, to a load side, and has various forms according to the capacity and use thereof.

Korean Utility Model Publication No. 87-1383 disclose a power transfer switch including a manipulation lever, a controlling axis, a movable contactor, a point plate and latch. In addition, the present applicant has invented and applied a power transfer switch that is more advanced than the power transfer switch disclosed in Korean Utility Model Publication No. 1987-0001383, as Patent Application No. 10-1996-0032363 (applied on Aug. 2, 1996).

FIG. 1 is a perspective view of a power transfer switch 1 for family use and for a small capacity. Referring to FIG. 1, the power transfer switch 1 connects or disconnects two different power sources, such as a normal power source and an emergency power source, or a star-connection power source and delta-connection power source. In addition, the power transfer switch 1 includes a disconnecting portion 10 through which phases R, S, T and N are exposed out of the power transfer switch 1, and a driving portion 20 from which a magnetic force is generated so that power may continue to supply power to products requiring power while contacts between the power transfer switch and an interior wiring terminal vary as a substation as a transmitting side is grounded.

That is, in the power transfer switch 1, while the phases R, S, T and N constituting a normal power terminal (not shown), an emergency power terminal 12 and a load terminal 13 are each installed in a separate frame 10', the phases R, S, T and N are sequentially assembled using bolts and adhesives to constitute a disconnecting portion 10. The driving portion 20 is disposed at one end of the disconnecting portion 10 so as to selectively supply power.

However, in the power transfer switch 1, while the phases R, S, T and N are each installed in the separate frame 10', the phases R, S, T and N are sequentially assembled using bolts and adhesives. Thus, an error may arise due to current when the power transfer switch 1 operates according to an accumulated assembly tolerance, thereby reducing reliability of the power transfer switch 1.

In addition, the phases R, S, T and N need to be sequentially assembled, it is inconvenient to assembly the power transfer switch 1, and it takes a long time to assemble the power transfer switch 1.

SUMMARY OF THE INVENTION

The present invention provides a one body-type power transfer switch, in which a disconnecting portion is integrally formed to reduce errors arisen due to accumulated assembly tolerance and simplify manufacturing processes, thereby improving operators' convenience.

Additional aspects will be set forth in part in the description which follows and, in part, will be apparent from the description, or may be learned by practice of the presented embodiments.

According to an aspect of the present invention, there is provided a one body-type power transfer switch includes a normal power terminal or an emergency power terminal which are respectively formed at upper portions of sides of the one body-type power transfer switch, wherein the normal power terminal receives power from a substation, and the emergency power terminal receives power from an emergency generator, a module including a load terminal formed at a lower portion of a side of the module so as to be spaced apart from the normal power terminal or the emergency power terminal, wherein the load terminal is used to supply power supplied from the normal power terminal or the emergency power terminal to the outside of the power transfer switch, and a moveable contactor that is selectively connected to the normal power terminal or the emergency power terminal, wherein the module is formed using an injection molding method, and side walls are integrally formed to have insulating power between power terminal connecting portions and a load terminal connecting portion so that the power terminal connecting portions and the load terminal connecting portion do not electrically contact each other.

In addition, the module includes side walls that electrically insulate the normal power terminal or the emergency power terminal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
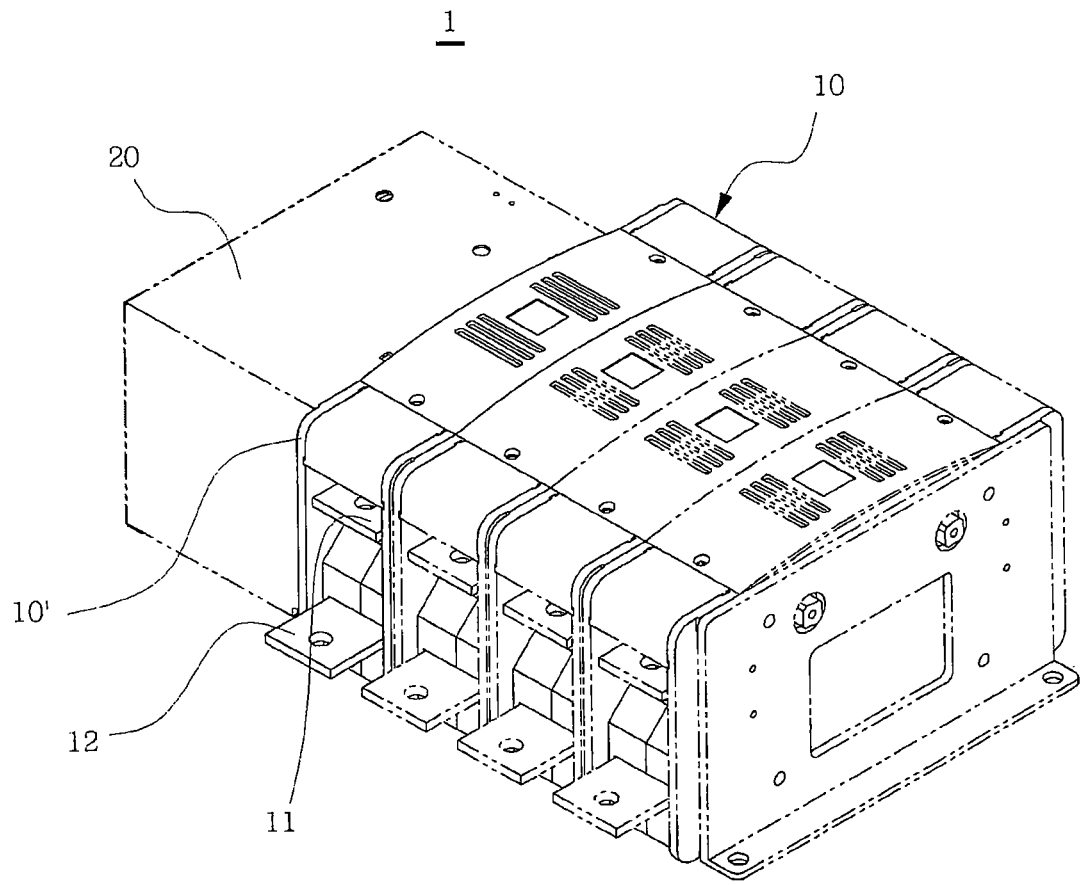
FIG. 1 is a perspective view of a power transfer switch for family use and for a small capacity.
Figure 2:
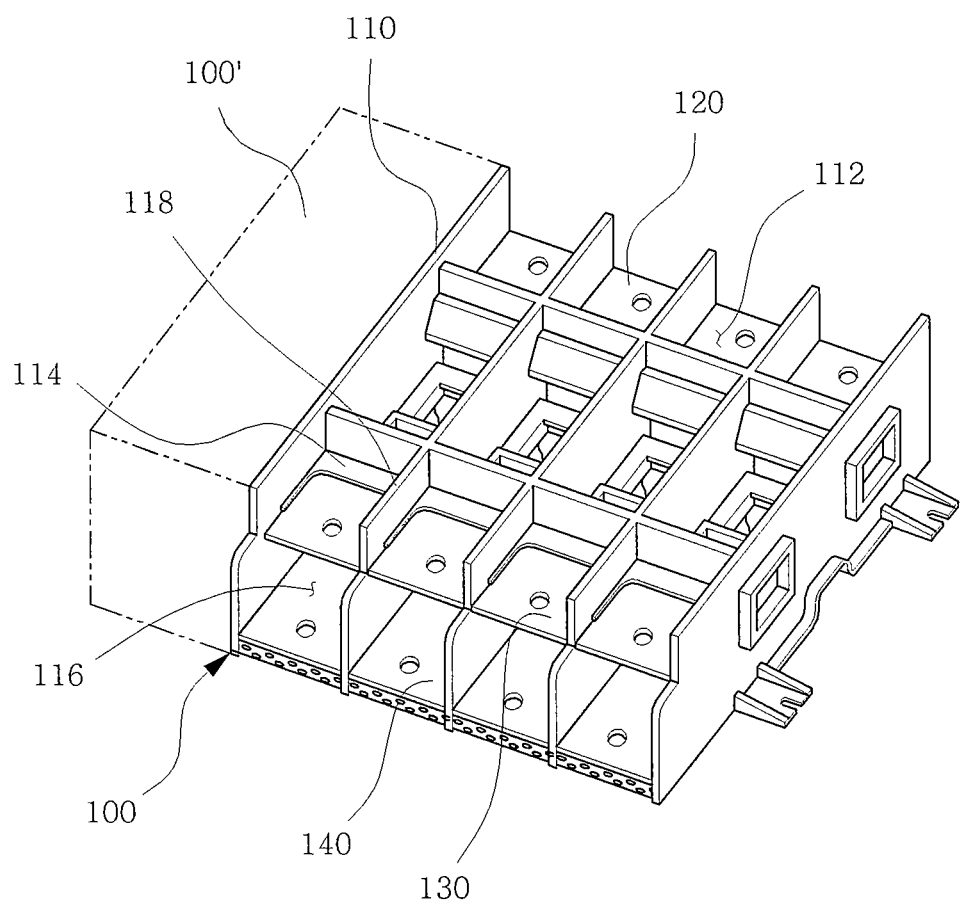
FIG. 2 is a one body-type power transfer switch according to an embodiment of the present invention.
Figure 3:
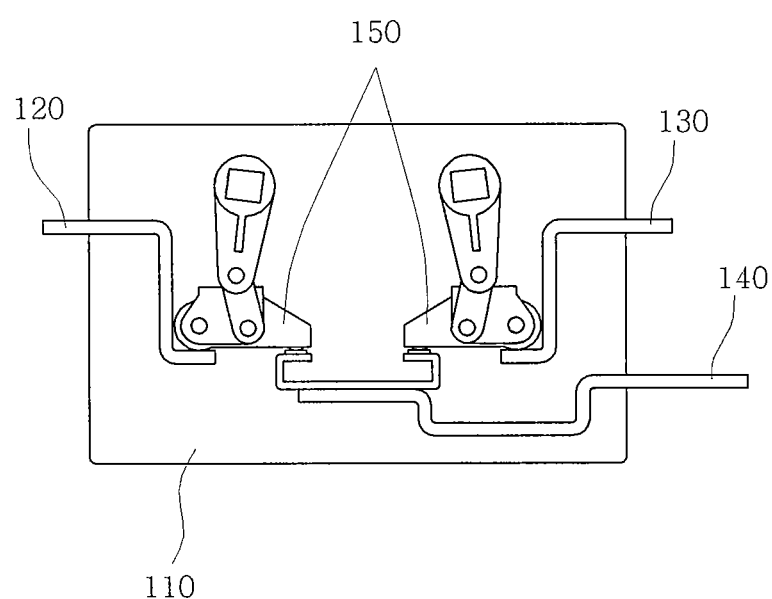
FIG. 3 is a cross-sectional view of the one body-type power transfer switch of FIG. 2.

FIG. 2 is a one body-type power transfer switch according to an embodiment of the present invention. FIG. 3 is a cross-sectional view of the one body-type power transfer switch of FIG. 2.

As described in the description of the related art of the present specification, the power transfer switch includes a disconnecting portion 100 for connecting or disconnecting power, and a driving portion 100' for generating a magnetic force. The disconnecting portion 100 includes two power terminals 120 and 130 of a normal power terminal 120 and an emergency power terminal 130, a load terminal 140 for transferring power supplied from the power terminals 120 and 130 to the outside of the power transfer switch, and a moveable contactor 150 that contacts the power terminals 120 and 130 and the load terminal 140 so as to supply power to the outside of the power transfer switch.

In detail, the disconnecting portion 100 as the technical feature of the power transfer switch includes a one body-type module 110, the normal power terminal 120 and the emergency power terminal 130, which are respectively formed at upper portions of sides of the one body-type module 110, the load terminal 140 that is formed at a lower portion of a side of the one body-type module 110 and is electrically connected to the power terminals 120 and 130 to transfer power supplied from the power terminals 120 and 130 to the outside of the power transfer switch, and the moveable contactor 150 for electrically connecting the power terminals 120 and 130, and the load terminal 140, as illustrated in FIGS. 2 and 3.

As shown in FIG. 2, the one body-type module 110 is integrally formed using an injection molding method, and includes four normal power terminal connecting portions 112 and four emergency power terminal connecting portions 114, which are formed at upper portions of sides of the one body-type module 110 so that the phases R, S, T and N may be coupled to the one body-type module 110, and a load terminal connecting portion 116 formed at a lower portion of a side of the one body-type module 110 so as to be spaced apart from the power terminal connecting portions 112 and 114.

In addition, side walls 118 are formed between the power terminal connecting portions 112 and 114 coupled to the phases R, S, T and N, and the load terminal connecting portion 116 so that the phases R, S, T and N may not be electrically connected.

Comparing the one body-type power transfer switch according to the present embodiment with a conventional power transfer switch, the one body-type module 110 of the one body-type power transfer switch is integrally formed using an injection molding method, and thus assembly is completed by coupling only the power terminals 120, 130 and 140 to each other. On the other hand, the conventional power transfer switch is manufactured by respectively installing the phases R, S, T and N in separate frames and then coupling the frames by using coupling members such as bolts or adhesives, and thus an assembling period of time is increased due to an inconvenient assembling process, thereby increasing manufacturing costs.

As described above, a module of the conventional power transfer switch is manufactured by respectively installing the phases R, S, T and N in frames including side walls and then coupling the frames to each other, and thus a thickness of the side wall is increased, and material costs are increased. However, according to the present embodiment, the one body-type module 110 may overcome these problems, and the size of the power transfer switch may be reduced by reducing the thickness of the side wall.

Conventionally, since the conventional power transfer switch is manufactured using sequential assembly processes, an error may arise due to current when the conventional power transfer switch operates according to an accumulated assembly tolerance. However, according to the present embodiment, the one body-type module 110 of the power transfer switch according to the present embodiment is integrally formed, and thus the error may be prevented by removing the accumulated assembly tolerance.

As shown in FIG. 3, the moveable contactor 150 electrically connects the normal power terminal 120 and the load terminal 140 to each other, and thus the power transfer switch having the above-described structure usually continues to supply power to a device requiring power. In addition, when power is shut off from a substation, the power transfer switch continues to supply power by automatically transferring power to the emergency power terminal 130.

Thus, the disconnecting portion 10 is formed to be integrated with the power transfer switch, and thus errors may be prevented by removing the accumulated assembly tolerance and reliability may be improved.

In addition, an operation of assembling the disconnecting portion 10 is not required, and thus manufacturing processes are simplified, and a manufacturing period of time may be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A one body-type power transfer switch comprising:
   a normal power terminal and an emergency power terminal, which are respectively located at upper portions of sides of a module of the one body-type power transfer switch, wherein the normal power terminal receives power from a substation, and the emergency power terminal receives power from an emergency generator;
   wherein the module comprises a load terminal located at a lower portion of a side of the module so as to be spaced apart from the normal power terminal and the emergency power terminal, wherein the load terminal is used to supply power supplied from the normal power terminal and or the emergency power terminal to the outside of the power transfer switch; and
   a moveable contactor that is selectively connected to the normal power terminal or the emergency power terminal,
   wherein the module is integrally formed using an injection molding method, and includes side walls that are located to have insulating power between the power terminal connecting upper portions coupled to phases R, S, T and N and the load terminal connecting lower portion so that the phases R, S, T and N do not electrically contact each other.

* * * * *